(12) United States Patent
Madkour

(10) Patent No.: US 7,052,582 B2
(45) Date of Patent: May 30, 2006

(54) WAVE POWERED EVAPORATION DESALINATION SYSTEM

(76) Inventor: Yousry E. Madkour, 1910 Springer Rd., San Diego, CA (US) 92105-5253

( * ) Notice: Subject to any disclaimer, the term of this patent is extended or adjusted under 35 U.S.C. 154(b) by 534 days.

(21) Appl. No.: 10/205,230

(22) Filed: Jul. 23, 2002

(65) Prior Publication Data
US 2004/0016631 A1    Jan. 29, 2004

(51) Int. Cl.
| B01D 3/10 | (2006.01) |
| B01D 3/42 | (2006.01) |
| C02F 1/04 | (2006.01) |

(52) U.S. Cl. ............... 202/173; 159/900; 159/902; 159/DIG. 40; 202/181; 202/205; 203/11; 203/73

(58) Field of Classification Search ........ 202/172–173, 202/181, 160, 205, 236; 203/1, 2, 11, 10, 203/71, 100, 73; 159/900, 902, DIG. 40; 210/294, 416.3
See application file for complete search history.

(56) References Cited

U.S. PATENT DOCUMENTS

| 3,697,383 | A | * | 10/1972 | Weaver | 202/174 |
| 3,725,206 | A | * | 4/1973 | Foley | 202/205 |
| 3,864,215 | A | * | 2/1975 | Arnold | 203/11 |
| 4,111,610 | A | * | 9/1978 | Brown | 417/332 |
| 4,120,756 | A | * | 10/1978 | Carman | 203/11 |
| 4,335,576 | A | * | 6/1982 | Hopfe | 60/398 |
| 4,421,461 | A | | 12/1983 | Hicks et al. | 417/53 |
| 4,512,886 | A | | 4/1985 | Hicks et al. | 210/170 |
| 4,536,257 | A | * | 8/1985 | Atwell | 202/177 |
| 4,664,751 | A | * | 5/1987 | Lloyd | 202/176 |
| 4,770,775 | A | | 9/1988 | Lopez | 210/321.83 |
| 5,186,822 | A | | 2/1993 | Tzong et al. | 210/122 |
| 5,366,635 | A | | 11/1994 | Watkins | 210/651 |
| 5,975,865 | A | | 11/1999 | Manabe | 417/331 |
| 6,083,382 | A | | 7/2000 | Bird | 210/96.2 |
| 6,100,600 | A | | 8/2000 | Pflanz | 290/54 |
| 6,932,889 | B1 | * | 8/2005 | Holcomb | 203/11 |

FOREIGN PATENT DOCUMENTS

JP    2001090977    9/2001

* cited by examiner

*Primary Examiner*—Virginia Manoharan

(57) ABSTRACT

A wave powered evaporation desalination system for removing fresh water from salt water by extraction of water vapor from a negative pressure container using wave motion for power. The wave powered evaporation desalination system includes a first vessel that accepts salt water. The salt water is forced from the first vessel through a atomizing spray nozzle into the top of a negative pressure second vessel. The negative pressure second vessel includes a number of trays that fill up with salt water films. Two pumps are attached to the top of the second vessel. One pump draws brine from the bottom of the second vessel for dispersion outside the system. The other pump draws off the water vapor from the second vessel into a hose and back to normal atmospheric pressure. The two pumps are powered by a float hinged to the second vessel.

8 Claims, 6 Drawing Sheets

WAVE POWERED EVAPORATION DESALINATION SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to salt water desalination units and more specifically it relates to a wave powered evaporation desalination system for removing fresh water from salt water by the extraction of water vapor from a negative pressure container using wave motion for power.

2. Description of the Related Art

Salt water desalination units have been in use for years. Salt water can be desalinated to produce fresh water through a variety of ways but typically desalination units utilize reverse osmosis to separate fresh water from salt water. Reverse osmosis, though effective, requires a significant amount of energy to generate the amount of pressure necessary for the process to work efficiently. Fossil fuel energy systems typically power such systems and correspondingly these systems generate pollution. In addition, fossil fuels are a finite resource and expensive, and therefore ill suited for poorer nations desiring a method of generating fresh water.

The energy generated by the rise and fall of waves has been studied for years. However, wave power has not been effectively utilized to run a reverse osmosis desalination system. As most desalination systems use reverse osmosis, the pressures necessary for the system to work efficiently are too power demanding for this type of energy system. In addition, other methods for desalinating water have not effectively utilized wave power.

Examples of patented devices which may be related to the present invention include U.S. Pat. No. 4,512,886 to Hicks et al.; U.S. Pat. No. 4,770,775 to Lopez; U.S. Pat. No. 5,366,635 to Watkins; U.S. Pat. No. 6,083,382 to Bird; U.S. Pat. No. 5,186,822 to Tzong et al.; U.S. Pat. No. 4,421,461 to Hicks et al.; U.S. Pat. No. 5,975,865 to Manabe; and U.S. Pat. No. 6,100,600 to Pflanz.

While these devices may be suitable for the particular purpose to which they address, they are not as suitable for removing fresh water from salt water by extraction of water vapor from a negative pressure container using wave motion for power.

The need for fresh water in the world continues to grow. However, the desalination of the ocean and other salt water bodies continues to be underdeveloped due to technology limitations. Reverse osmosis demands considerable energy and is therefore too costly. The energy systems normally utilized pollute the environment and drain limited finite fossil fuel resources. Wave power, though pollution free, is not typically efficient enough to provide the energy necessary for traditional desalination systems.

In these respects, the wave powered evaporation desalination system according to the present invention substantially departs from the conventional concepts and designs of the prior art, and in so doing provides an apparatus primarily developed for the purpose of removing fresh water from salt water by extraction of water vapor from a negative pressure container using wave motion for power

BRIEF SUMMARY OF THE INVENTION

In view of the foregoing disadvantages inherent in the known types of desalination units now present in the prior art, the present invention provides a new wave powered evaporation desalination system construction wherein the same can be utilized for removing fresh water from salt water by extraction of water vapor from a negative pressure container using wave motion for power The general purpose of the present invention, which will be described subsequently in greater detail, is to provide a new wave powered evaporation desalination system that has many of the advantages of the desalination units mentioned heretofore and many novel features that result in a new wave powered evaporation desalination system which is not anticipated, rendered obvious, suggested, or even implied by any of the prior art desalination units, either alone or in any combination thereof.

To attain this, the present invention generally comprises a first vessel that accepts salt water. The salt water is forced from the first vessel through a spray nozzle which atomizes the salt water into a fine mist into the top of a second vessel. The second vessel is maintained at a negative pressure. The second vessel includes a number of trays that fill up with salt water. Two pumps are attached to the top of the second vessel. The first pump draws off the water vapor from the top of the second vessel into a hose and back to normal atmospheric pressure where condensation occurs. The second pump draws brine from the bottom of the second vessel for dispersion outside the system. These pumps are powered by a float attached to the second vessel. The system can include an array of second vessels to generate a greater volume of fresh water.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a wave powered evaporation desalination system that will overcome the shortcomings of the prior art devices.

A second object is to provide a wave powered evaporation desalination system for removing fresh water from salt water by extraction of water vapor from a negative pressure container using wave motion for power.

Another object is to provide a wave powered evaporation desalination system that is economical to produce.

An additional object is to provide a wave powered evaporation desalination system that is easily transportable.

A further object is to provide a wave powered evaporation desalination system that does not require much technical knowledge to set-up and operate.

Another object is to provide a wave powered evaporation desalination system that can be used in the ocean or on salt water lakes.

Another object is to provide a wave powered evaporation desalination system that can include a farm array of multiple systems.

A further object is to provide a wave powered evaporation desalination system that allows for long-term maintenance free use.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
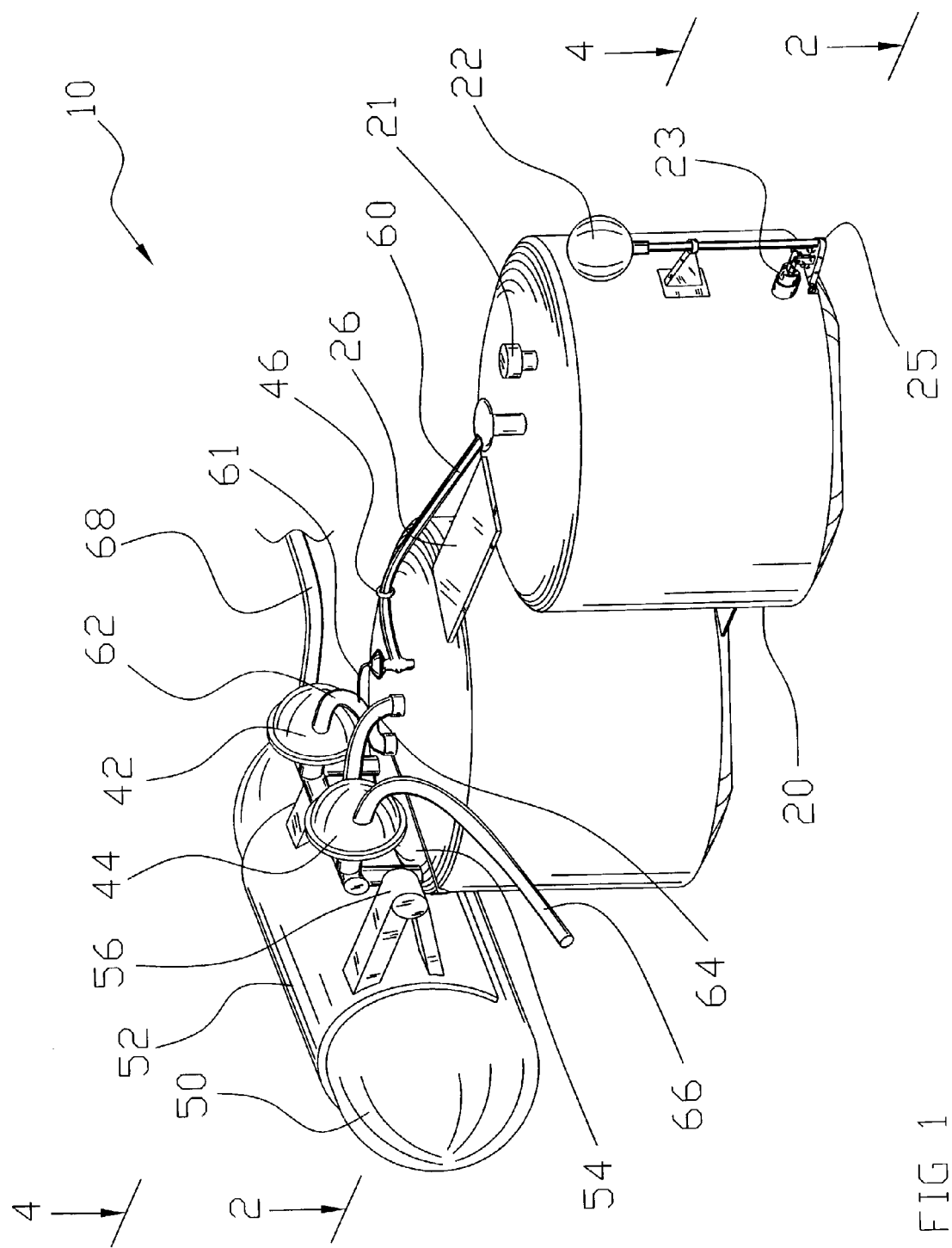
FIG. 1 is an upper perspective view of the present invention.

Turning now descriptively to the drawings, in which similar reference characters denote similar elements throughout the several views, FIGS. 1 through 6 illustrate a wave powered evaporation desalination system 10, which comprises a first vessel 20 attached to a second vessel 30. The second vessel 30 is maintained at negative pressure. Salt water is drawn into the first vessel 20 and then forced through a nozzle 48 into the second vessel 30 where the water vapor is drawn off to form fresh water. The resulting leftover brine collecting at the bottom of the second vessel 30 is discharged from the second vessel 30 into the surrounding salt water. Wave motion is utilized to power the transfer of the salt water, brine and water vapor. The wave powered evaporation desalination system 10 can be an individual unit or assembled into a farm array to produce a greater volume of fresh water. All components of the wave powered evaporation desalination system 10 are preferably constructed from materials that are resistant to deterioration by salt water and/or sunrays.

Figure 2:
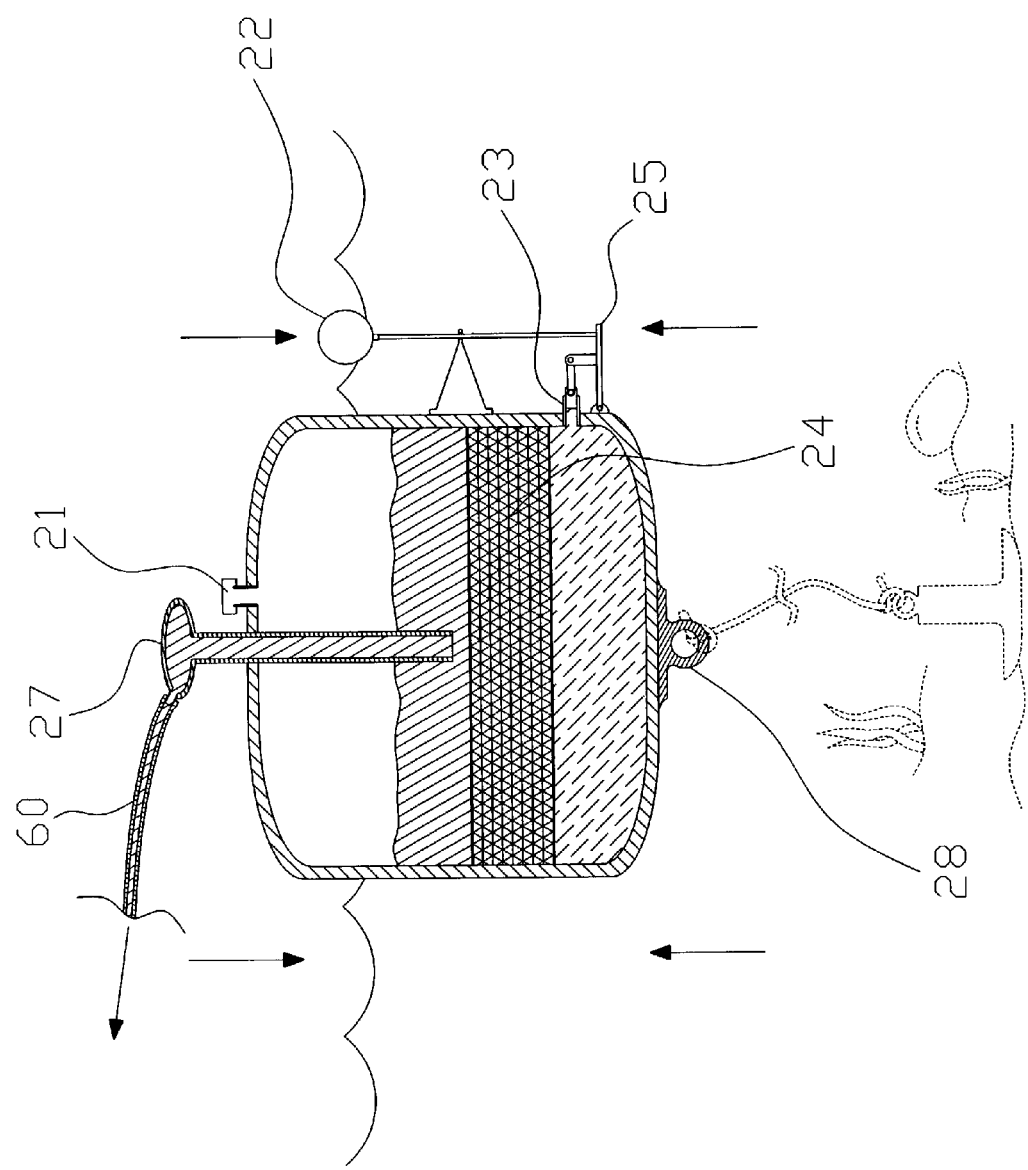
FIG. 2 is a cross-sectional view taken along line 2—2 of FIG. 1.
Figure 3:
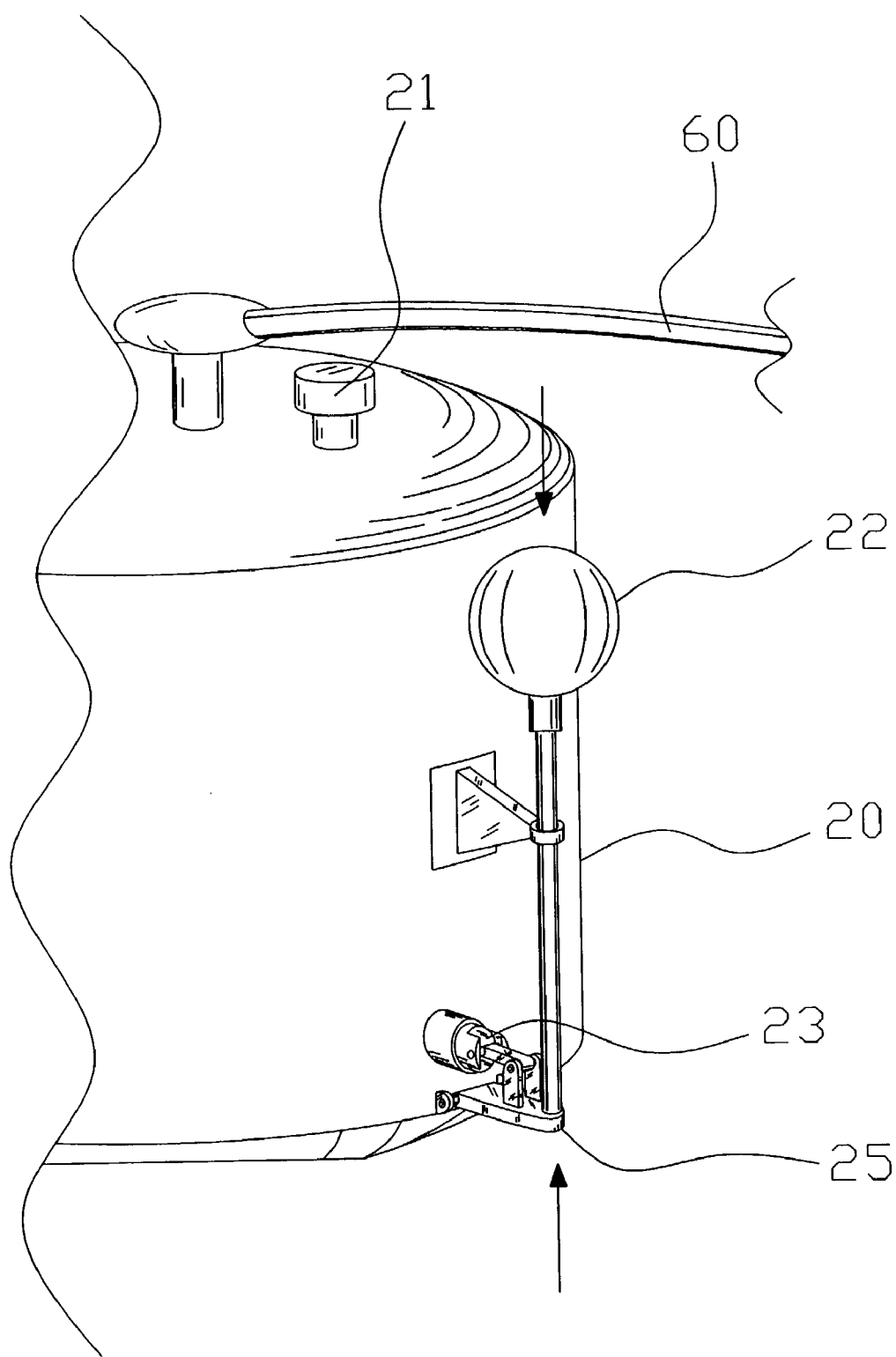
FIG. 3 is a partial perspective view of the first vessel.

As best seen in FIG. 2, the first vessel 20 is weight controlled to float on the surface of the body of salt water. Attached to the bottom of the first vessel 20 is a securing eyeplate 28 that allows the first vessel 20 to be secured to the floor of the body of water to keep the wave powered evaporation desalination system 10 from drifting from its preferred location. A first valve 21 is preferably located on the top of the first vessel 20 to maintain atmospheric pressure in the first vessel 20. Attached to the side of the first vessel 20 is a first float 22. This first float 22 is attached in such a manner that it can reciprocate relative to the wave motion. As the first float 22 travels upwards and downwards the first float's 22 motion is transferred through the hinged connection 25 to the second valve 23. The second valve 23 is preferably designed to allow the salt water to only travel into the first vessel 20. The second valve 23 opens and closes forcing salt water inside the first vessel 20. As seen in FIG. 2, a filter 24 is affixed inside the first vessel 20 to keep debris from being drawn into the second vessel 30. A first pipe 27 runs from a position above the filter 24 through the top of the first vessel 20. The first pipe 27 is designed to allow salt water to be drawn from the first vessel 20. However, it can be appreciated by one skilled in the art that different configurations of the first vessel 20 can be used to introduce salt water to the wave powered evaporation desalination system 10.

A first hose 60 is attached from the first pipe 27 to the nozzle 48. The nozzle 48 is attached to the top of the second vessel 30. A third valve 46, permitting only one-way flow of fluid, is attached to the first hose 60 to ensure a positive flow of salt water from the first vessel 20 to the second vessel 30. The nozzle 48 is designed to open and close, and to atomize the salt water to produce a fine mist when fluid travels through the nozzle 48. Connected between the nozzle 48 and the second hose 62 is a pressure signal line 61. The pressure signal line 61 is designed to cause the nozzle 48 to close when there is insufficient negative pressure in the second vessel 30.

The second vessel 30 is physically attached to the first vessel 20 using first connection spacers 26. As shown in FIG. 1, the first connection spacers 26 are attached to the top and bottom of the first vessel 20 and second vessel 30. However, it can be appreciated by one skilled in the art that other methods of attachment between the first vessel 20 and the second vessel 30 can be utilized.

Figure 4:
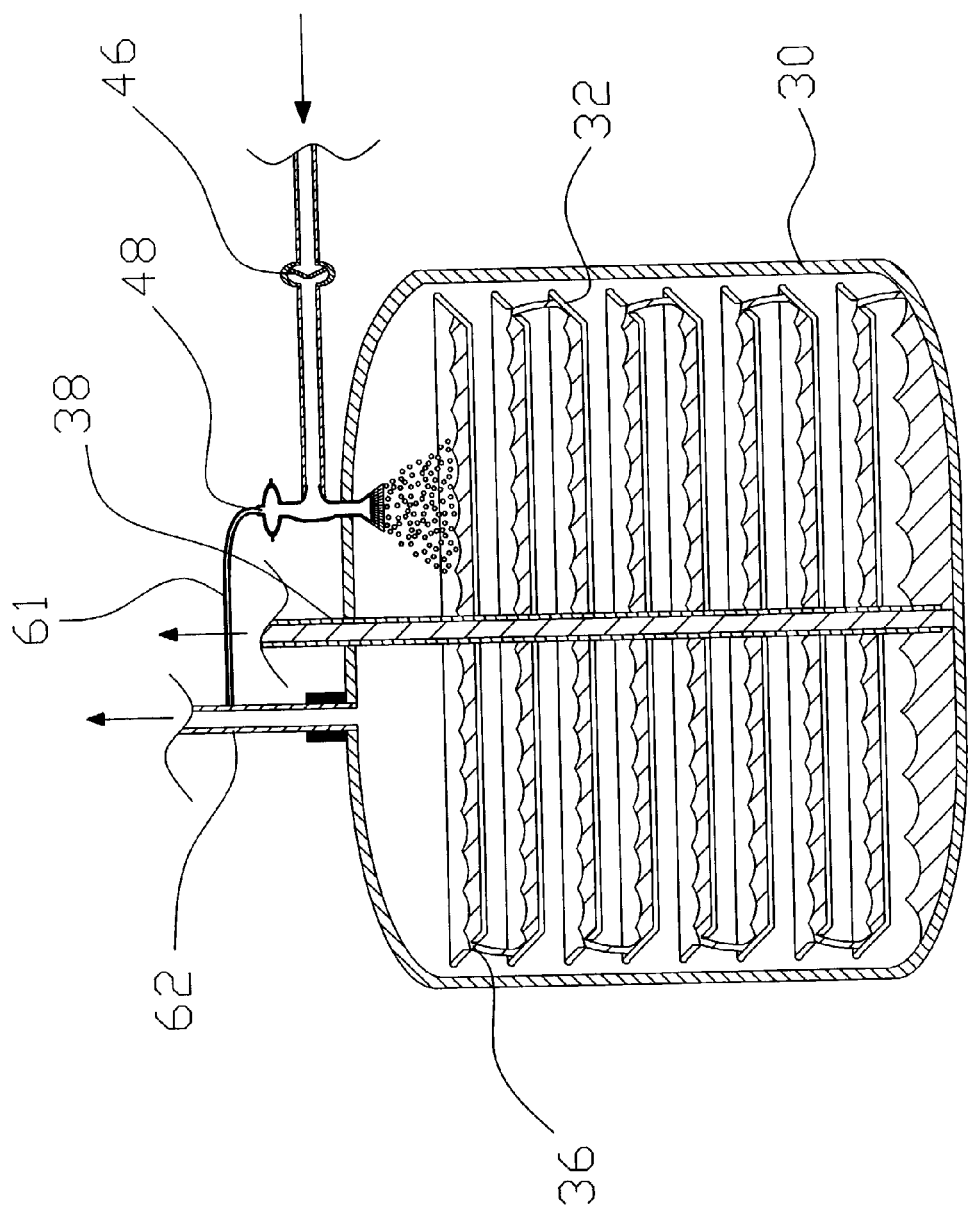
FIG. 4 is a cross-sectional view taken along line 4—4 of FIG. 1.
Figure 5:
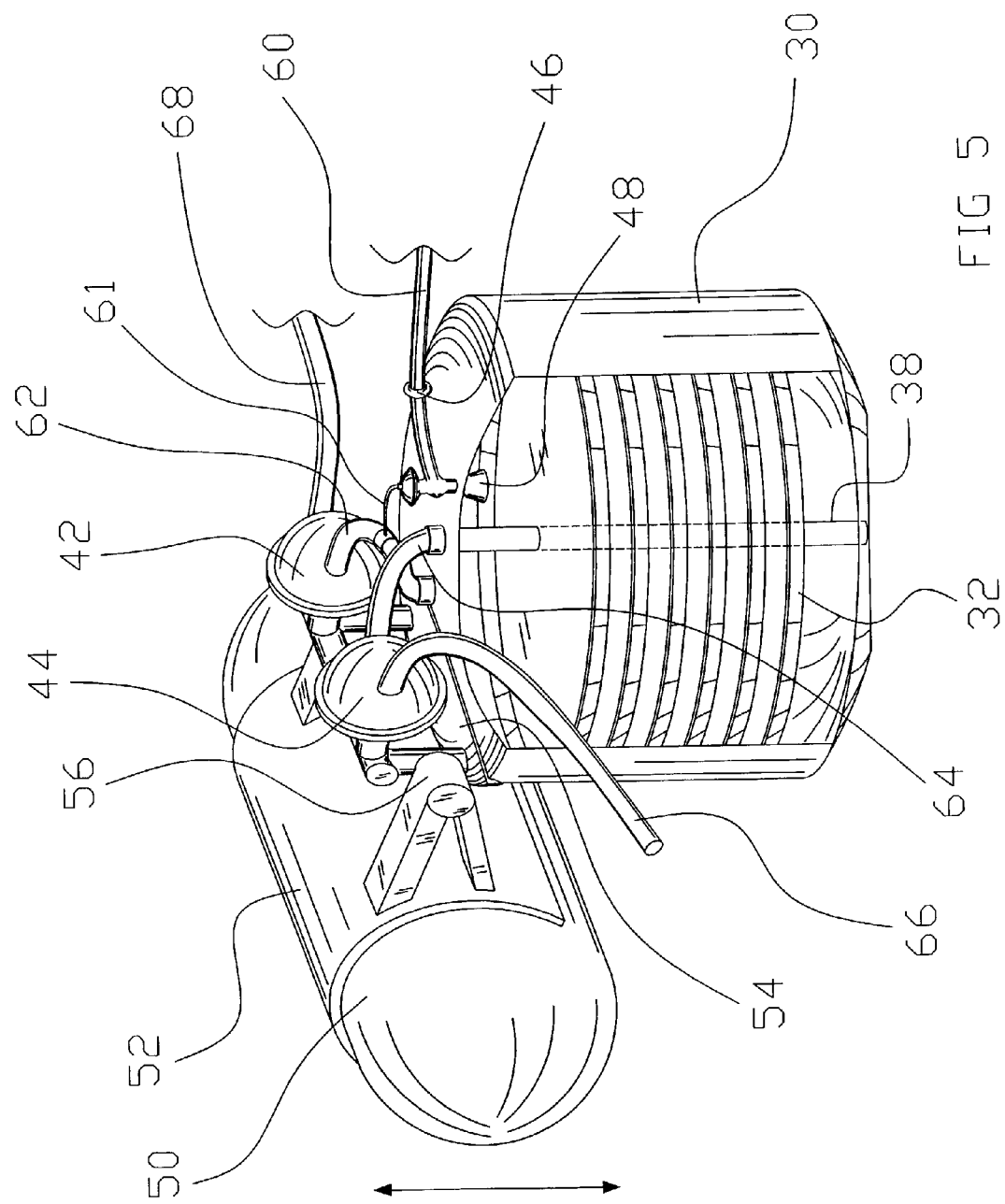
FIG. 5 is a partial sectional view of the second vessel.

The second vessel 30 is a vessel constructed with a wall thickness sufficient to maintain its shape while being kept at a negative pressure. Running through the top and down the center of the second vessel 30 is a second pipe 38. The second pipe 38 is attached to the top of the second vessel 30. The second pipe 38 is designed to allow fluid to be drawn through it. The length of the second pipe 38 is such that brine can be drawn from the bottom of the second vessel 30. A third hose 64 is attached to the end of the second pipe 38 that extends outside the second vessel 30. As best seen in FIG. 4, a plurality of trays 32 are attached to the second pipe 38 in a stacked pattern. The trays 32 may be constructed of a low height to increase the number of trays 32 which may be attached to the second pipe 38. The trays 32 preferably include holes 36 to permit the saltwater to travel from a higher tray 32 to a lower tray 32 until the salt water reaches the bottom of the second vessel 30.

A second hose 62 is affixed to the top of the second vessel 30. The other end of the second hose 62 is connected to a first pump 42. The first pump 42 is preferably constructed so that it can draw the water vapor from the second vessel 30 and then discharge the water vapor to a fifth hose 68. Condensation of the water vapor occurs in the fifth hose 68 as the water vapor travel from negative pressure to atmospheric pressure. A third hose 64 is connected on one end to the second pipe 38 and to the other end to the second pump 44. The second pump 44 is designed to draw the brine from the second vessel 30 through the second pipe 38 and the third hose 64. The second pump 44 then discharges the brine outside the system through the fourth hose 66.

Through wave motion, the second float 50 provides the power for the first pump 42 and the second pump 44. The second float 50 is attached to the second vessel 30 using a first attachment 52 and a second attachment 54. The first attachment 52 is connected to the second float 50. The second attachment 54 is connected to the second vessel 30. Hinging arms 56 connect the first attachment 52 to the second attachment 54. As the second float 50 moves relative to the motion of the waves the hinging arms 56 reciprocate pumping the first pump 42 and the second pump 44. However, it can be appreciated by one skilled in the art that a variety of different methods could be used to manipulate the power of waves to drive the first pump 42 and the second pump 44. The method of attaching the first float attachment 52 to the second float 50 and the second float attachment 54 to the second vessel 30 should preferably utilize materials and attachment methods which are durable yet resistant to salt water and sunrays.

Figure 6:
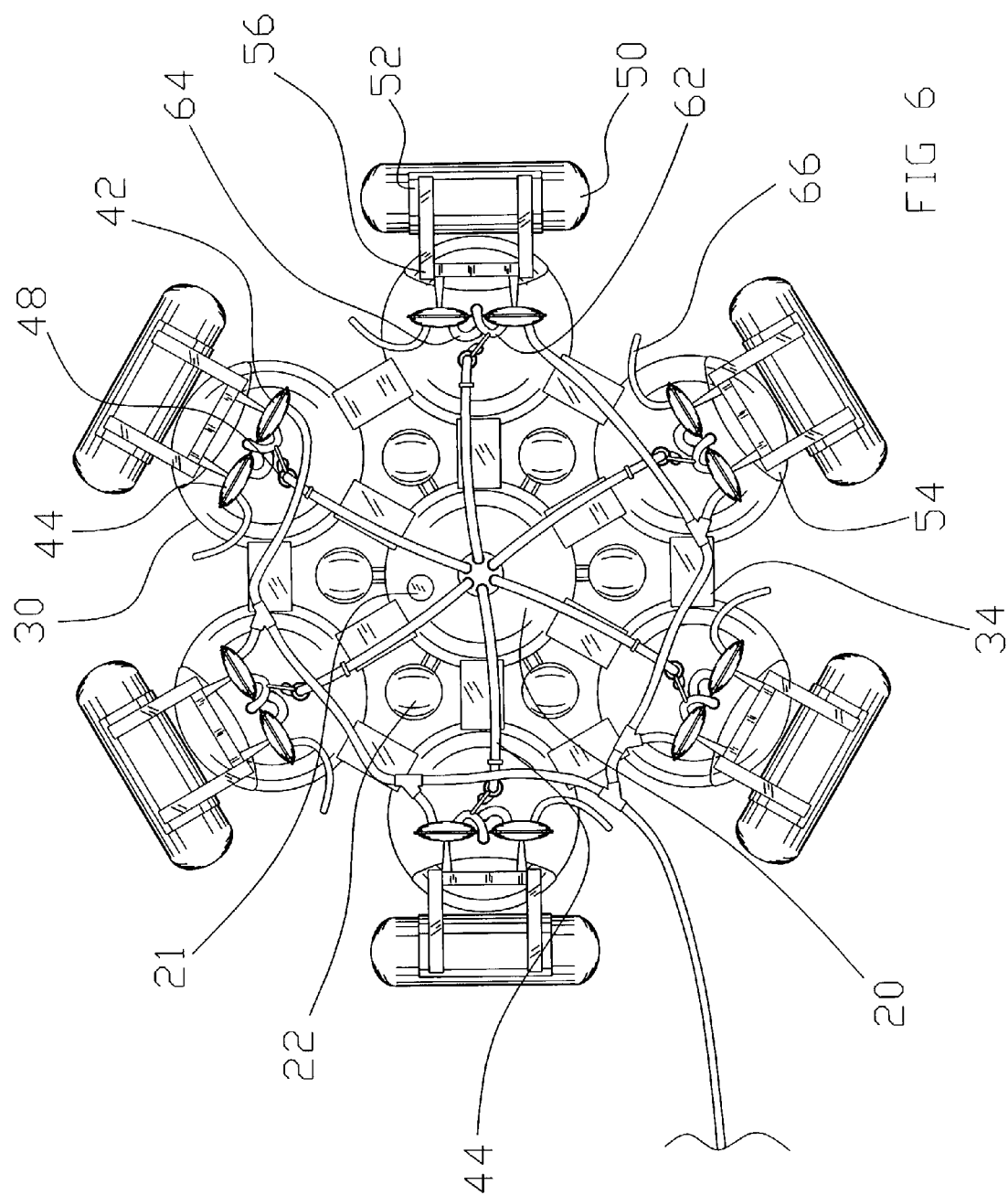
FIG. 6 is a top view of a farm array of the present invention.

Though the wave powered evaporation desalination system 10 is designed to function using one first vessel 20 with one second vessel 30 it may be found to be more efficient in certain circumstances to use a farm array arrangement using multiple second vessels 30. As best seen in FIG. 6, one first vessel 20 could be connected to multiple second vessels 30. Multiple first connection spacers 26 could be used to connect the first vessel 20 to the multiple second vessels 30. Second connection spacers 34 could be used between the multiple second vessels 30 to maintain the physical structure. Multiple floats 22 would preferably be connected to the first vessel 20 to provide the necessary salt water for the second vessels 30. The first pipe 27 on the single first vessel 20 may have a plurality of holes to allow connecting to a corresponding number of first hoses 60. The fifth hoses 68 from each second vessel's 30 second pump 44 may be interconnected to provide fresh water to a single location.

In use, the wave powered evaporation desalination system 10 is placed into salt water either in the ocean or a salt lake with sufficient wave motion to power the system. The system is then placed into the preferred location and maintained in place by connecting the securing eyeplate 28 with a tether to a fixation device on the bottom of the body of water. As the waves of the body of water move up and down, the float 22 attached to the first vessel 20 moves up and down. As the float 22 moves it opens and then closes the second valve 23 forcing salt water into the first vessel 20. Due to the pressure differential between the negative pressure second vessel 30 and the first vessel 20 salt water is drawn to the nozzle 48. As water travels through the nozzle 48, the nozzle 48 atomizes the salt water causing a fine mist of salt water to be sprayed into the second vessel 30. The mist of salt water lands onto the first of a plurality of trays 32. As each tray 32 fills with salt water the salt water spills over into the next corresponding tray 32. As the water leaves the last tray 32 it drains into the bottom of the second vessel 30.

The second vessel 30 is maintained at a negative pressure by the constant withdrawing of water vapor from the system. As the waves move up and down the second float 50 moves up and down. This movement is then transferred through the hinging arms 56 to the first pump 42 and the second pump 44. The first pump 42 draws off the water vapor and pushes it into the fifth hose 68. Condensation to fresh water occurs as the water vapor goes through a phase change from the environment of negative pressure in the second vessel 30 to the normal atmospheric pressure of the fifth hose 68. The second pump 44 draws brine from the bottom of the second vessel 30 through the second pipe 38 and forces the brine into the surrounding salt water through the fourth hose 66.

As seen in FIG. 6, when in use in a farm array system multiple second vessels 30 are attached to a first vessel 20. The first vessel 20 may include numerous floats 22 to assist in forcing salt water into the system. As the water vapor is drawn from the individual second vessels 30 the fresh water output is combined as it comes from the fifth hoses 68. The overall configuration and dimensions of a farm array of wave powered evaporation desalination systems 10 are such that the system is easily transportable.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A wave powered distillation system, comprising:
   a first vessel for receiving a controlled volume of salt water;
   a second valve fluidly connected to said first vessel, wherein said second valve controls the volume of salt water introduced into said first vessel;
   a first float hingedly attached to said second valves to open and close said second valve;
   a second vessel comprised of a second pipe and a plurality of trays in a stacked pattern, wherein said trays attach to a section of said second pipe, internally of said second vessel;
   a nozzle positioned within said second vessel, wherein said nozzle is fluidly connected to said first vessel for dispersing said salt water into said second vessel;
   a first pump fluidly connected to said second vessel for extracting a water vapor and for maintaining a negative pressure within said second vessel;
   a second pump fluidly connected to said second pipe for extracting brine from said second vessel;
   a second float mechanically connected to said first pump and said second pump for actuating said pumps, wherein said second float is attached externally of said first vessel and said second vessel for engaging the salt water external of said vessels, wherein said second float is manipulated by the waves, and wherein said second float mechanically powers said first pump and said second pump by the waves, and wherein said first float is mechanically powered by the waves;
   a condensing unit fluidly connected to said first pump for condensing said water vapor; and a first valve fluidly connected to said first vessel for maintaining a substantially constant atmospheric pressure in said first vessel.

2. The wave powered distillation system of claim 1, wherein said first vessel includes a filter for removing debris from said salt water.

3. The wave powered distillation system of claim 1, wherein said second vessel includes a second pipe traveling through the top of said second vessel to a point above the bottom of said second vessel thereby allowing brine to be drawn from said bottom of said second vessel through said second pipe.

4. The wave powered distillation system of claim 1, wherein said nozzle is comprised of an atomizer for dispersing said salt water into a fine mist.

5. The wave powered distillation system of claim 1, wherein said nozzle is attached to a pressure sensor which is capable of closing said nozzle when said negative pressure falls outside preset pressure parameters.

6. A wave powered distillation system, comprising:
   a first vessel for receiving a controlled volume of salt water;
   a plurality of second valves fluidly connected to said first vessel, wherein said second valves control the volume of salt water introduced into said first vessel;
   a first float hingedly attached to said second valves to open and close said second valve;
   a plurality of second vessels each including a second pipe and a plurality of trays in a stacked pattern, wherein said trays attach to a section of said second pipe, internally of said second vessels;
   a nozzle positioned within each said second vessel, wherein each said nozzle is fluidly connected to each said first vessel for dispersing said salt water into each said second vessel;
   a first pump fluidly connected to each said second vessel for extracting a water vapor and for maintaining a negative pressure within each said second vessel;
   a second pump fluidly connected to each said second pipe for extracting brine from each said second vessel;
   a second float mechanically connected to said first pump and said second pump for actuating said pumps, wherein said second float is attached externally of said first vessel and said second vessel for engaging the salt water external of said vessels, wherein said second float is manipulated by the waves, and wherein said second float mechanically powers said first pump and said second pump by the waves, and wherein said first float is mechanically powered by the waves;
   a condensing unit fluidly connected to each said first pump for condensing said water vapor; and
   a first valve fluidly connected to said first vessel for maintaining a substantially constant atmospheric pressure in said first vessel.

7. The wave powered distillation system of claim 6, wherein said first vessel includes a filter for removing debris from said salt water.

8. The wave powered distillation system of claim 6, wherein each said second vessel includes a second pipe traveling through the top of each of said second vessels to a point above the bottom of each said vessel thereby allowing brine to be drawn from said bottom of each of said second vessels through said second pipe.

* * * * *